United States Patent [19]

Uchidoi et al.

[11] 4,389,111
[45] Jun. 21, 1983

[54] CAMERA

[75] Inventors: Masanori Uchidoi, Yokohama; Yoshihiro Shigeta, Tokyo; Ryoichi Yoshikawa, Yokohama; Yoichi Tosaka, Shakujii; Shosuke Haraguchi, Yokohama, all of Japan

[73] Assignee: Canon Kabushiki Kaisha, Tokyo, Japan

[21] Appl. No.: 295,361

[22] Filed: Aug. 24, 1981

[30] Foreign Application Priority Data

Aug. 28, 1980 [JP] Japan .................. 55-118621[U]

[51] Int. Cl.³ .............................................. G03B 1/18
[52] U.S. Cl. .................................. 354/173; 354/234; 354/268
[58] Field of Search ................... 354/60 R, 173, 266, 354/268, 50, 234

[56] References Cited

U.S. PATENT DOCUMENTS 4,126,877 11/1978 Ohtaki et al. ................... 354/60 R
4,201,463 5/1980 Harigaya et al. ................ 354/173
4,299,466 11/1981 Harvey ............................ 354/173

Primary Examiner—Russell E. Adams
Attorney, Agent, or Firm—Toren, McGeady and Stanger

[57] ABSTRACT

A camera includes a shutter which is electromagnetically closed at the end of a given exposure time. Circuitry in the camera operates to prevent a prolonged opening of the shutter from occurring when the camera battery voltage drops below a satisfactory operating level during an exposure, wherein the shutter mechanism is forcibly recharged.

7 Claims, 2 Drawing Figures

CAMERA

BACKGROUND OF THE INVENTION

1. Field of the Invention

This invention relates to cameras having electrically timed shutters, and more particularly to camera with an electrically operated magnetic device controlling the opening and closing operation of the shutter mechanism whereby when the voltage of the electrical power supply source for the device falls below a prescribed level, the camera is positively returned to the wound up position so that the shutter is prevented from being accidentally left open.

2. Description of the Prior Art

Conventional methods of locking camera shutter blades mechanically after charging the shutter when the camer is wound up, followed by releasing the shutter from its locking connection have been realized in the following three types of electrically operated magnetic control devices for the shutter:

(1) During the period of energization of an electromagnet, the locking holds. Then when the duration of energization is terminated, the shutter is released from the locking connection by the force of a previously power-stored or charged spring;

(2) The electromagnet is combined with a permanent magnet so that when the electromagnet is not energized, the attractive force of the permanent magnet holds the locking connection. Then when the electromagnet is energized, the magnetic flux of the permanent magnet is cancelled out, permitting the force of the previously power-stored spring to release the shutter; and (3) Energization of the electromagnet causes attraction of an armature which in turn causes releasing of the shutter.

Considering particularly the closing operation of the shutter, type (1) has a disadvantage that because of the necessity of maintaining a current supply all the time when the shutter is open, the consumed electrical energy is large particularly in the case of long exposures.

Further, the types (2) and (3) suffer from the possibility of the accidental occurrence that the shutter is left open should the voltage of the battery fall at a time during the exposure, and the magnetic control device is not actuated by the current supply to the electromagnet after the termination of duration of the predetermined shutter time. If the operator is unaware of this accident, then when the film is rewound, all the exposed area of the film will be fogged. Nevertheless, until now, no good idea that can solve these problems has been put into practice.

SUMMARY OF THE INVENTION

An object of the present invention is to provide a camera having an electrically timed shutter which can overcome the above-described drawbacks.

That is, an electric motor is built in the camera to form a camera having a motor driven winding function, and such camera is combined with either one of the above-described types (2) and (3) of electrically timed shutters along with a detection circuit for detecting the driving voltage of the electromagnet. When the voltage for driving the electromagnet falls below a prescribed level, the motor for the winding is positively energized despite the incomplete elapse of the predetermined shutter time. Thus, the camera is would up and at the same time the shutter is charged to the closed position, with the advantage that any damage due to the above-described accidental occurrence is limited to a minimum.

Another object of the invention is to provide a faulty operation preventing device for a camera, operating in such a manner that when the battery voltage falls below a prescribed value at a time during the exposure control, a shutter charging operation is initiated, so that the shutter mechanism is moved to its initial position.

Still another object of the invention is to provide a camera in which it is detected whether or not the shutter is closed, and when the closing operation of the shutter is terminated, the film winding motor is energized to effect automatic film winding, so that even when the occurrence of the closing operation of the shutter is sensed in a prescribed time interval after the termination of the exposure time, the motor is energized independently of the detection of the closing operation of the shutter. This causes the phase of shutter operation to be shifted to the initial state, so that an accident wherein the shutter is left open can be avoided.

These and other objects and features of the invention will become apparent from the following detailed description of embodiments thereof taken in conjunction with the accompanying drawings in which:

DESCRIPTION OF THE PREFERRED EMBODIMENTS

The present invention will next be described in greater detail by reference to the drawings.

Figure 1:
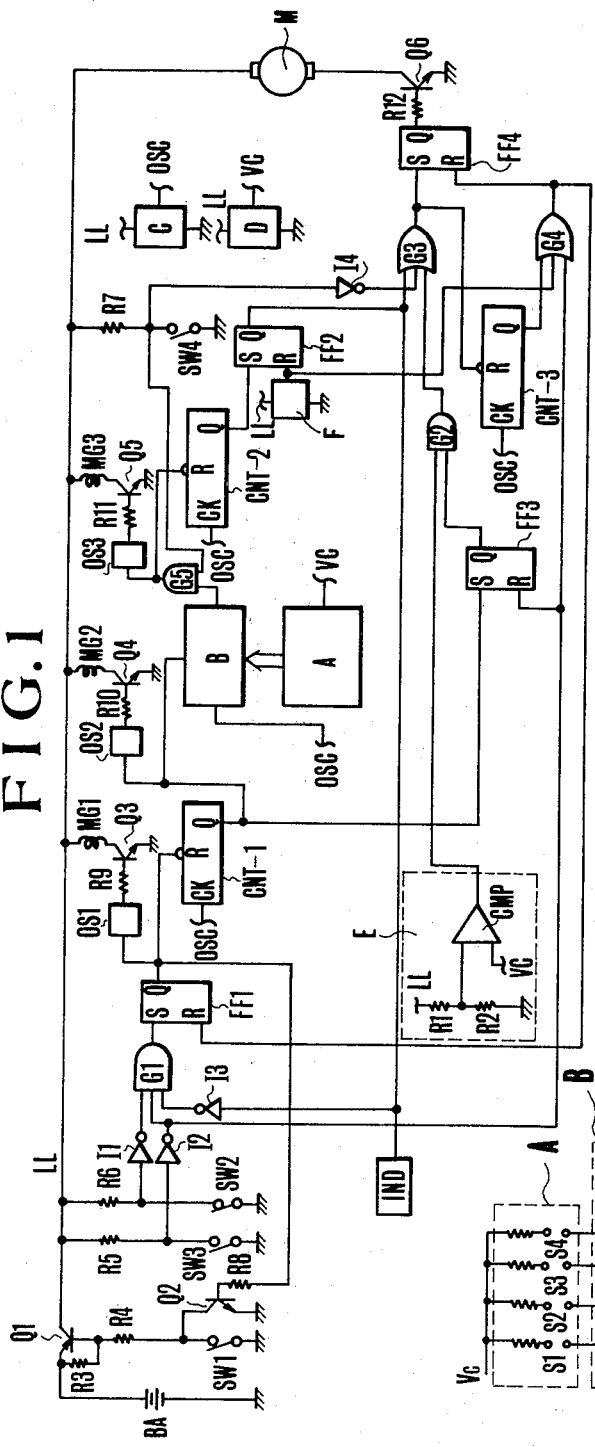
FIG. 1 is an electrical circuit diagram showing an embodiment of a camera according to the present invention.

In FIG. 1 there is shown an embodiment of a control circuit of the electrical camera according to the present invention.

BA indicates an electrical power supply source or battery, and is a normally open switch SW1 for light measurement is arranged to be turned on when a shutter release button is depressed to a first stroke. One end of the switch is grounded, and the opposite end is connected through a resistor R4 to the base of a PNP transistor Q1. Connected in the base-emitter path of the transistor Q1 is a resistor R3. The emitter of the transistor Q1 is connected to the positive terminal of the battery BA and the collector is connected to a power supply line LL for the various circuit portions in the next stage.

SW3 indicates normally open switch arranged to be turned on when a one-frame advancement of the film is completed. Said switch is grounded at one end and is connected at the other end through a resistor R5 to the line LL. SW2 indicates a normally open switch arranged to be turned on when the above-described release button is depressed to a second stroke and having one end grounded. The opposite end of the switch is connected through a resistor R6 to the line LL.

G1 indicates an AND gate having three inputs, one of which is connected through an inverter I1 to a junction point of the swith SW2 and the resistor 6, another input which is connected through an inverter I2 to a junction point of the switch SW3 and the resistor R5, and the other of which is connected through an inverter I3 to an output Q of an RS flip-flop FF2. The output of the AND gate G1 is connected to a "set" input of an RS flip-flop FF1, and an output Q of the flip-flop FF1 is connected through a one-shot circuit OS1 and a resistor R9 to the base of an NPN transistor Q3. The emitter of transistor Q3 is grounded, and the collector is connected to a release control magnet coil MG1 at one end, the opposite end of which is connected to the line LL. The output Q of flip-flop FF1 is further connected to a "reset" input of a counter CNT-1, and through a resistor R8 to the base of an NPN transistor Q2. Said transistor Q2 is connected in parallel with the switch SW1.

The counter CNT-1 has an output Q which is connected through a one-shot circuit OS2 and a resistor R10 to the base of an NPN transistor Q4. MG2 indicates a magnet coil for releasing the leading blades of the shutter from the locking connection when the coil is energized. One end of said coil MG2 is connected to the line LL, and the other end is connected through a transistor Q4 to the circuit ground.

A is an exposure factor setting circuit and B a shutter time control circuit responsive to the output of said exposure factor setting circuit A for controlling the period of actuation of the shutter. Note that OSC is an output of an oscillator circuit C which provides a clock pulse train applied to the input of the circuit B.

The output Q of counter CNT-1 is connected to another input of the shutter time control circuit B. It is at a point in time of the rising edge of the output Q of the counter CNT-1 that the shutter time control circuit B is actuated. In a certain shutter time obtained by the exposure factor setting circuit, the circuit B produces an output signal of high level (hereinafter referred to as H level signal). G5 indicates an AND gate having two inputs, one of which is connected to the output of the shutter time control circuit SW4 indicates a switch for sensing the termination of a running down movement of the trailing curtain of the shutter, and is arranged to be turned on when the trailing blade of the shutter nears the terminal end of movement. One end of the switch is connected to the circuit ground, and the opposite end is connected through a resistor R7 to the line LL. The resistor R7 and the switch SW4 are junctioned at a point which is connected to the other input of the AND gate G5. The output of said AND gate G5 is connected through a one-shot circuit OS3 and a resistor R11 to the base of an NPN transistor Q5. MG3 indicates a solenoid for releasing the trailing blade of the shutter from the locking connection when the solenoid is energized. One end of the solenoid MG3 is connected to the line LL, and the other end is connected through the transistor Q5 to the circuit ground. The output of AND gate G5 is further connected to a "reset" input of an abnormality detecting counter CNT-2.

Said counter CNT-2 has an output Q which is connected to a "set" input of the RS flip-flop FF2, and this flip-flop FF2 has an output Q which is connected to a three-input OR gate G3 at one input thereof, through the inverter I3 to one of the inputs of the AND gate G1, and is further connected to an indicating means IND such as a light emitting diode or a buzzer.

Further connected to another input of said gate G3 is the junction point of the above-described switch SW4 and the resistor R7, through an inverter I4. The output Q of counter CNT-1 is connected to a "set" input of an RS flip-flop FF3, and this flip-flop has an output Q which is connected to a two-input AND gate G2 at one input thereof. The gate G2 has an output which is connected to one of the inputs of the above-described OR gate G3.

E indicates a battery voltage detecting circuit comprising a voltage divider of resistors R1 and R2 connected between the line LL and the circuit ground, the junction point of both resistors being connected to the inversion input of a comparator CMP, while the non-inversion input is connected to a reference voltage source Vc. Therefore, when the battery voltage is lowered below the prescribed or reference voltage, the comparator CMP produces an H level signal. Note that the reference voltage Vc is an output of a constant voltage circuit D. Also note that the output of the comparator CMP is connected to one of the inputs of the AND gate G2.

The output of OR gate G3 is connected to a "set" input of an RS flip-flop FF4, and the OR gate output Q is connected through a resistor R12 to the base of an NPN transistor Q6. M indicates an electric motor connected at one end to the line LL and at the other end through the transistor Q6 to the circuit ground.

The output of OR gate G3 is further connected to a "reset" input of a counter CNT-3 and an output Q of said counter is connected to one of the three inputs of an OR gate G4. Said gate G4 has an output which is connected to the "reset" inputs of the above-described flip-flops FF1 and FF4.

F indicates a reset pulse generating circuit for producing a reset pulse when the battery switch is thrown. Also the output of said pulse generating circuit F is connected to the "reset" terminal of the flip-flop FF2, and one of the inputs of OR gate G4.

Note that the output of inverter I2 is connected to the "reset" input of the flip-flop FF3 and one of the inputs of OR gate G4.

Further, the CK terminals of counters CNT-1 to CNT-3 are clock pulse input terminals receptive of the output of the above-described oscillator circuit C in the form of the pulse signal OSC.

Figure 2:
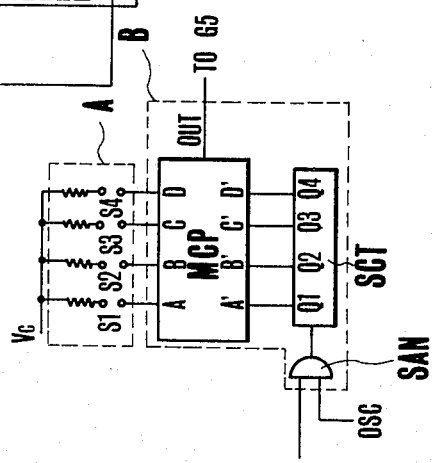
FIG. 2 is an electrical circuit diagram of a practical example of the exposure factor setting circuit A and shutter time control circuit B of FIG. 1.

FIG. 2 shows a practical example of the exposure factor setting circuit A and shutter time control circuit B of FIG. 1. In FIG. 2, S1 to S4 are switch elements having ON and OFF positions and cooperate with a shutter dial (not shown). By said switch elements, the exposure time information set in the shutter dial is set in a binary coded form. SCT indicates a counter having an input terminal which is connected to an output of an AND gate SAN, and having outputs Q1 to Q4 which are connected to respective inputs A' to D' of a magnitude comparator MCP. Opposite inputs A to D of the magnitude comparator MCP are connected to the above-described switch elements S1 to S4. When the count value of the counter SCT becomes a value corresponding to the shutter time set in the switch elements S1 to S4, the comparator MCP produces an H signal at the output thereof.

The operation of the circuit of FIG. is as follows:

When the shutter button (not shown) is pushed, the switch SW1 is first turned on, so that the transistor Q1 is turned on to start current supply to the entire circuitry. Then, the reset pulse generating circuit F produces the reset pulse. Responsive to this pulse, the flip-flops FF1, FF2 and FF4 are reset.

Also, since the switch SW3 is ON in the wound up position, the output of the inverter I2 resets the flip-flop FF3 too.

Therefore, the outputs Q of all the flip-flops take a low level (hereinafter referred to as "L level").

Upon further depression of the shutter button, the switch SW2 is turned on. Since, as has been mentioned above, in the winding up completed position, the winding up detection switch SW3 is ON and the output Q of flip-flop FF2 is of L level, the output of AND gate G1 is of H level. Responsive to this, the flip-flop FF1 changes its output Q to H level which is applied through the resistor R8 to turn on the transistor Q2. From this time onwards, even when the operator removes his finger from depressing the release button to turn off the switch SW1, the power supply is sustained.

Such change of the output of flip-flop FF1 to H level also causes release of the counter CNT-1 from the reset condition. Then, said counter CNT-1 starts to count. At the same time, the one-shot circuit OS1 produces an output which is maintained at H level for a predetermined time. Responsive to this, the transistor Q3 turns on, permitting the release magnet coil MG1 to be supplied with current. Thus, the mechanisms (not shown) within the camera housing start to operate. For example, the mirror flips upwards and the diaphragm is closed down for presetting.

Also this causes the above-described winding up completion detecting switch SW3 to be turned off.

Such sequence of actuation of the mechanisms as described above take a certain time to complete for which the counter CNT-1 counts clockpulses. When the number of clock pulses counted reaches a predetermined value, the output Q of the counter CNT-1 is changed from L to H level.

This triggers the one-shot circuit OS2, so that the leading blade release coil MG2 is energized for a predetermined time. Then, the leading blade of the shutter starts to run down. At this time, the gate SAN of FIG. 2 is opened and the counter SCT in the shutter time control circuit B starts to count. It is noted here that at this time the flip-flop FF3 is set. But, if the battery voltage is sufficiently high and therefore the output of the battery voltage detecting circuit E is of L level, the output of the gate G2 remains unchanged from L level.

After an exposure operation is initiated in such a way as described above, as time goes on, counting of the counter SCT is advancing. When the duration of a time interval equal to the shutter time set in the exposure factor setting circuit A or in the switch elements S1 to S4 is terminated, the magnitude comparator MCP in the shutter time control circuit B changes its output from L to H level.

Since until this point in time the switch SW4 for sensing the completion of a running down movement of the trailing blade of the shutter is OFF, the output of the AND gate G5 is changed to H level, causing the one-shot circuit OS3 to produce an H level signal of predetermined duration. This results in the energization of the trailing blade release magnet coil MG3. The production of the H level signal from the AND gate G5 also causes actuation of the abnormality detecting counter CNT-2.

The magnetic flux generated in the coil MG3 cancels the attractive force of a permanent magnet (not shown) so that the trailing blade covers a shutter opening, thus terminating the exposure.

It is noted that since the abnormality detecting counter CNT-2 is pre-adjusted so as to continue counting for a slightly longer time than that from the moment at which the trailing blade actuating signal has been produced from the AND gate G5, to the moment at which the closing operation of the trailing blade of the shutter is completed, when the closing operation is normal, the switch SW4 is closed just before the shutter closing operation is terminated. Such closure of the switch SW4 causes the output of AND gate G5 to change to L level at which the counter CNT-2 is reset. Thus, further counting no longer proceeds. Such change of the output of AND gate G5 also causes change of the output of OR gate G3 to H level which causes the flip-flop FF4 to be set. When set, the output of flip-flop FF4 is changed to H level, so that the transistor Q6 is rendered conducting to supply the winding motor M with current. When the motor M is energized, the above-mentioned mirror is returned to the initial position, and the diaphragm closing down lever is also returned to fully open the lens again. Also, the shutter is charged in a manner known in the art, and the film is advanced through the length of one frame. When this cycle of film winding and shutter charging operation is completed, the switch SW3 is turned on. This causes the output of inverter I2 to change to H level which in turn causes the flip-flop FF3 to be reset, and through the OR gate G4, the flip-flops FF1 and FF4 to be reset. Thus, the motor M is de-energized.

If the operator continues pushing the release button, the above-described procedure repeats itself again to make the next exposure.

Now assuming that the trailing blades does not work normally, though the manner in which the circuitry operates after the turning on of the switch SW1 and before the start of energization of the trailing blade release magnet coil MG3, together with the start of counting of the counter CNT-2, is the same as when the operation is normal as in the above, then when the trailing blade does not move, the switch SW4 remains open. Therefore, as the above-described predetermined number of pulses (a certain time interval) have been counted, the output Q of the counter CNT-2 is changed from L to H level at which the flip-flop FF2 is set, and the output of flip-flop FF2 is changed from L to H level. Then, the flip-flop FF4 is set through the OR gate G3. Thus, the motor is forcibly energized to carry out the next cycle of film winding and shutter charging operation.

When the output of flip-flop FF2 is changed from L to H level, the output of inverter I3 is changed to L level at which the AND gate G1 is closed. Therefore, the continuance of pushing the release button along with the closure of the winding completion switch SW3 does not lead to the transition to the next release sequence, because the AND gate G1 is gated off. And, the operator is warned of the fact that an abnormality has occurred in the shutter by the indicating means IND as it produces sound or intermittent light.

Next, where the shutter time is very long, or where a series of frame exposures are taken continuously, it sometimes happens that the actual voltage of the battery is suddenly dropped. In this case, the potential at the junction point of the voltage divider resistors R1 and R2 in the circuit E is lowered, exceeding the level predetermined as Vc. Then, the output of the comparator CMP is changed to H level. After the leading blade start signal has been produced from the counter CNT-1, therefore, the flip-flop FF4 is set to energize the motor M.

After the flip-flop FF4 has once been set, energization of the motor M is maintained until the winding up completion sensing switch SW3 is turned on again. It is to be understood that the fall in the battery voltage results in the immediate transition from the exposure operation to the winding operation despite its occurrence before the termination of duration of the shutter time. Thus, it never happens that the shutter is accidentally left open.

Note that the counter CNT-3 functions as a safety timer. At a point in time when the gate G3 produces the H level signal, in other words, in synchronism with the start of energization of the motor M, the counter CNT-3 starts to count. In a predetermined time interval, an H level signal is produced at the output Q and is applied to reset the flip-flop FF4, thereby the motor M is de-energized. Therefore, even in case where the switch SW3 is hindered from being turned on by some reason despite a winding operation is in progress, the current supply to the motor M is cut off after the above-described time interval of the safety timer has elapsed, so that it is made possible to prevent the motor M from being damaged due to the overload.

Though the foregoing discussion has been made in connection with that type of shutter which employs an electromagnet in controlling the releasing operation, it is to be understood that the principles of the invention are applicable to the other types of shutters, for example, the so-called electromagnetically driven shutter in which the energized electromagnet is used in directly driving the shutter blades to move.

As has been described above, according to the present invention, when the voltage for driving the electromagnet controlling the closing operation of the shutter falls below a satisfactory operating level, the shutter mechanism is forcibly charged by making use of the automatic winding function of a motor built in the camera, thus the film is protected from fogging which would otherwise result if the shutter is accidentally left open. Further a display of this condition is presented to warn the user of the fact that the battery voltage is not sufficiently high, and the battery must be exchanged by a fresh one.

What is claimed is:

1. A camera comprising:
   (a) shutter means including a shutter for opening and closing a shutter opening;
   (b) shutter release means for opening the shutter;
   (c) electromagnetic means for closing the shutter when a shutter time lapses;
   (d) voltage detecting means for detecting a voltage of a power source, said detecting means producing a signal when said voltage becomes less than a predetermined value; and
   (e) driving means for driving the shutter means to an initial position at which the shutter opening is closed in response to said signal from the detecting means.

2. A camera comprising:
   (a) shutter means including a shutter for opening and closing a shutter opening;
   (b) shutter release means for opening the shutter;
   (c) a shutter time control circuit for controlling a shutter time and providing an output when the shutter time has elapsed;
   (d) electromagnetic means for closing the shutter means in response to the output from the shutter time control circuit;
   (e) voltage detecting means for detecting a voltage of a power source, said detecting means producing a signal when said voltage becomes less than a predetermined value; and
   (f) driving means for driving the shutter means to an initial position at which the shutter opening is closed in response to said signal from the detecting means.

3. A camera comprising:
   (a) shutter means including a shutter for opening and closing a shutter opening;
   (b) shutter release means for opening the shutter;
   (c) a shutter timer circit for counting a shutter time and producing a signal when the shutter time lapses;
   (d) electromagnetic means for closing the shutter means in response to the signal from the shutter time circuit;
   (e) shutter detecting means for detecting if said shutter means has performed a closing operation;
   (f) a motor for charging said shutter means in response to the detection by said shutter detection means that said shutter means has performed the closing operation; and
   (g) voltage detecting means for detecting a voltage of a power source and for producing a signal when said voltage becomes less than a predetermined value;
   said motor being arranged to be actuated in response to the signal of said voltage detecting means independently of the operation of said shutter detecting means.

4. A camera system comprising:
   (A) a camera including:
      (a) shutter means including a shutter for opening and closing a shutter opening;
      (b) shutter release means for opening the shutter;
      (c) a shutter timer circuit for counting a shutter time and producing a signal when the shutter time lapses;
      (d) electromagnetic means for closing the shutter means in response to the signal from the shutter timer circuit;
      (e) shutter detecting means for detecting if said shutter means has performed a closing operation; and
      (f) voltage detecting means for detecting a voltage of a power source and for producing a signal when said voltage becomes less than a predetermined value; and
   (B) a motor driving unit including:
      (a) a motor arranged to be actuated in response to the detection by the shutter detecting means that a shutter closing operation has been performed so that a shutter-charging operation of the shutter means is carried out, and said motor also being arranged to be actuated in response to the signal from the voltage detecting means independently of the detecting operation of the shutter detecting means.

5. A camera comprising:
   (a) shutter means including a shutter for opening and closing a shutter opening;
   (b) shutter release means for opening the shutter;
   (c) a shutter timer circuit for counting a shutter time and producing a signal when the shutter time lapses;
   (d) means for closing the shutter means in response to the signal from the shutter timer circuit;

(e) shutter detecting means for detecting if said shutter means has performed a closing operation;
(f) a motor for charging said shutter means in response to the detection by said shutter detection means that said shutter means has performed the closing operation; and
(g) signal forming means for producing a signal in the absence of detection by the shutter detecting means of a closing operation of the shutter in a predetermined time interval after the production of the signal from said shutter timer circuit so that said motor is actuated.

6. A camera system comprising:
(A) a camera including:
 (a) shutter means including a shutter for opening and closing a shutter opening;
 (b) shutter release means for opening the shutter;
 (c) a shutter timer circuit for counting a shutter time and producing a signal when the shutter time lapses;
 (d) means for closing the shutter means in response to the signal from the shutter timer circuit;
 (e) shutter detecting means for detecting if said shutter means has performed a closing operation; and
 (f) signal forming means for producing a signal in the absence of detection by the shutter detecting means of a closing operation of the shutter in a predetermined time interval after the production of the signal from said shutter timer circuit; and
(B) a motor unit including:
 (a) a motor arranged to be actuated when said detecting means detects a closing operation of the shutter means so that a charging operation of the shutter means is performed, and said motor also being arranged to be actuated in response to the signal from said signal forming means independently of the operation of the detecting means.

7. A camera comprising:
(a) shutter means including a shutter for opening and closing a shutter opening;
(b) shutter release means for opening the shutter;
(c) a shutter timer circuit for counting a shutter time and producing a signal when the shutter time lapses;
(d) means for closing the shutter means in response to the signal from the shutter timer circuit;
(e) shutter detecting means for detecting if said shutter means has performed a closing operation;
(f) a motor for charging said shutter means in response to the detection by said shutter detection means that said shutter means has performed the closing operation; and
(g) timer means arranged to be actuated after a shutter time counting operation by said shutter timer circuit is terminated, for performing a time counting operation for a predetermined time and producing an output, so that said motor is actuated in response to the output of said timer means independently of the operation of said detecting means.

* * * * *